United States Patent

[11] 3,609,234

[72] Inventor Atsumi Hirata
Tokyo, Japan
[21] Appl. No. 814,417
[22] Filed Apr. 8, 1969
[45] Patented Sept. 28, 1971
[73] Assignee Victor Company of Japan Limited
Yokohama, Japan
[32] Priority Apr. 8, 1968
[33] Japan
[31] 43/27685

[54] DELAYED AGC CIRCUIT
4 Claims, 3 Drawing Figs.

[52] U.S. Cl. .......................................................178/7.3 DC, 325/410
[51] Int. Cl.......................................................... H04n 5/52
[50] Field of Search............................................ 178/7.3, 7.5; 325/410, 414, 415

[56] References Cited

UNITED STATES PATENTS

| | | | |
|---|---|---|---|
| 3,115,547 | 12/1963 | Tschannen | 178/7.3 |
| 3,306,976 | 2/1967 | Massman et al. | 178/7.3 |
| 3,341,780 | 9/1967 | Sethna | 325/405 |
| 3,344,355 | 9/1967 | Massman | 325/405 |
| 3,349,173 | 10/1967 | Gaprio | 178/7.3 |
| 3,351,861 | 11/1967 | Martin et al. | 325/410 |
| 3,414,820 | 12/1968 | Sinko et al. | 325/410 |
| 3,454,721 | 7/1969 | Wolff | 178/7.5 |
| 3,511,930 | 5/1970 | Rupley | 178/7.3 |

*Primary Examiner*—Robert L. Richardson
*Attorney*—Holman & Stern

ABSTRACT: An automatic gain control circuit is disclosed, the circuit being capable of varying an input voltage of a circuit amplifying an AGC voltage by means of a variable resistor, which voltage is to be fed to a high frequency stage of a television receiver. Accordingly, the location of a rising point where the AGC voltage makes a distinct increase on an input-signal intensity AGC voltage characteristic is likewise varied.

INVENTOR
Atsumi Hirata

BY Holman, Glascock, Downing & Seebold
ATTORNEYS

DELAYED AGC CIRCUIT

The present invention relates to an automatic gain control circuit, and particularly to an automatic gain control circuit available for making adjustable characteristic of the gain control voltage for a high-frequency amplifying stage in a television receiver.

Generally, functional objectives of an automatic gain control circuit (hereinafter this circuit shall be called as an AGC circuit) in a television receiver are classified into two objects; namely one is classified as a function to always maintain a detection output constant regardless of changes of an input signal, and the other is to keep the quality of a received picture in the optimum condition. The present invention provides an AGC circuit that is capable of realizing the latter object of the function of maintaining the quality of the received picture in the optimum condition.

In order to maintain the quality of the received picture in the optimum condition, the AGC circuit should meet the following two requirements; namely, 1. A S/N ratio should be large even with a weak intensity of input signal. In other words, a high-frequency amplifying stage (tuner) should be operating at its maximum sensitivity.
2. No cross modulation should be generated regardless of the strongest intensity of the input signal. In other words, the high-frequency amplifying stage (tuner) should be operating in a cutoff condition or in a choked condition of gain (because of high AGC voltage, heavier AGC function is performed).

Further, as far as the conventional AGC circuit of the television receiver is concerned, as a characteristic of a AGC voltage relative to the intensity of an input signal is determined and fixed in order to obtain proper functioning of the AGC circuit at a predetermined intensity of the input signal, a point where the AGC voltage begins to increase in accordance with the increased input signal intensity, namely, the point where the gain of the high frequency amplifying stage begins to be choked (hereinafter this point should be called a rising point S) from the stage of operation with the maximum sensitivity was fixed on the characteristic. In accordance with this situation in a case wherein the television receiver is installed in a location where said predetermined input signal intensity is not held, for instance in such a location where the input signal intensity is low with respect to a weak electric field wave, then the S/N ratio turns out small; and on the contrary, in a case when the television receiver is installed in a location where the input signal intensity is high with respect to a strong electric field wave, cross modulation and other detrimental effects were invited.

The present invention has been derived to eliminate successfully the above discrepancies accompanying the conventional AGC circuit.

A primary object of the present invention is to provide an automatic gain control circuit available for functioning in an optimum condition with a constantly favorable S/N ratio regardless of the intensity value of an input signal and without any cross modulation.

Another object of the present invention is to provide an automatic gain control circuit available for making the AGC voltage characteristic with respect to the input signal intensity changeable and especially, available for changing and setting at will an input signal intensity which the AGC voltage begins to be applied to the high-frequency amplifying stage.

A further object of the present invention is to provide an automatic gain control circuit available for changing the AGC voltage characteristic with respect to the input signal intensity, so that a favorable S/N ratio, no cross modulation, and the maximum sensitivity are obtained.

A still further object of the present invention is to provide an automatic gain control circuit of the superior AGC sensitivity by means of initiating an abrupt rise of the characteristic curve of the AGC voltage versus input signal intensity.

Other objects and distinctive features of the present invention will be apparent from the following descriptions accompanying drawings, in which.

Figure 1:
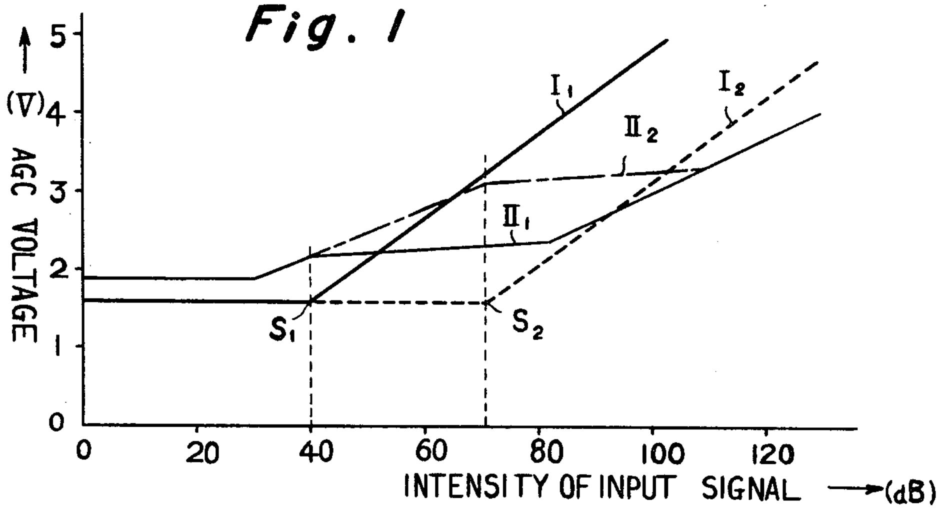
FIG. 1 is a characteristic curve of input signal intensity versus AGC voltage in the circuit of the present invention.

The characteristic of the input signal intensity (db.) versus AGC voltage (V) is represented in FIG. 1. A line $I_1$ represents the AGC voltage fed back to the high-frequency stage (tuner); a line $II_1$ represents the characteristic of the AGC voltage fed back to the intermediate frequency stage (1F). For example, the full line $I_1$ shows that in the case when the input signal intensity is within the range of 0~40db., the bias voltage keeps its constancy without being accompanied by the AGC function. The tuner is operating at its best sensitivity, however, in the range of above 40db. of the input signal intensity, and the AGC voltage is generated in accordance with the input signal intensity with accompaniment of the AGC function.

As far as the conventional AGC circuit is concerned, the AGC voltage characteristic represented by said lines $I_1$ and $II_1$ is fixed. Accordingly, for instance, in the line $I_1$, a rising point $S_1$ is fixed, where the AGC voltage begins to be generated and be increased in accordance with the increasing of the input signal intensity. So, in the case when a television receiver is installed in a location having an excessively low-input electric-field intensity, the television picture represents an image of small S/N ratio with the accompaniment of disturbing noise owing to a shortage of the high-frequency amplifying stage and, on the contrary, in the case when the receiver is installed in a location of an excessively high-input electric-field intensity, the television picture represents an inferior quality with the accompaniment of cross modulation.

In the present invention, the whole circuit is so constituted that the AGC voltage characteristic shown with the full line $I_1$ can be replaced by the characteristic $I_2$ shown with a broken line and also the input signal intensity corresponding to the point $S_2$ where the AGC voltage begins to be generated can be increased in its value.

In addition to the above advantageous effects, when the AGC voltage corresponding to the high-frequency stage is changed from the characteristic shown with the full line $I_1$ to that shown by the broken line $I_2$, the AGC voltage characteristic corresponding to the IF stage necessarily changes from the condition shown with the full line $II_1$ to the characteristic shown with the single dot chain line $II_2$. Accordingly, in accordance with the value of the input signal intensity in the location where the television receiver is installed, it becomes possible to change the rising point S where the AGC voltage begins to be generated so that the point S may be located between said points $S_1$ and $S_2$ where S/N ratio turns out large and at the same time, the cross modulation is eliminated.

Figures 2, 3:
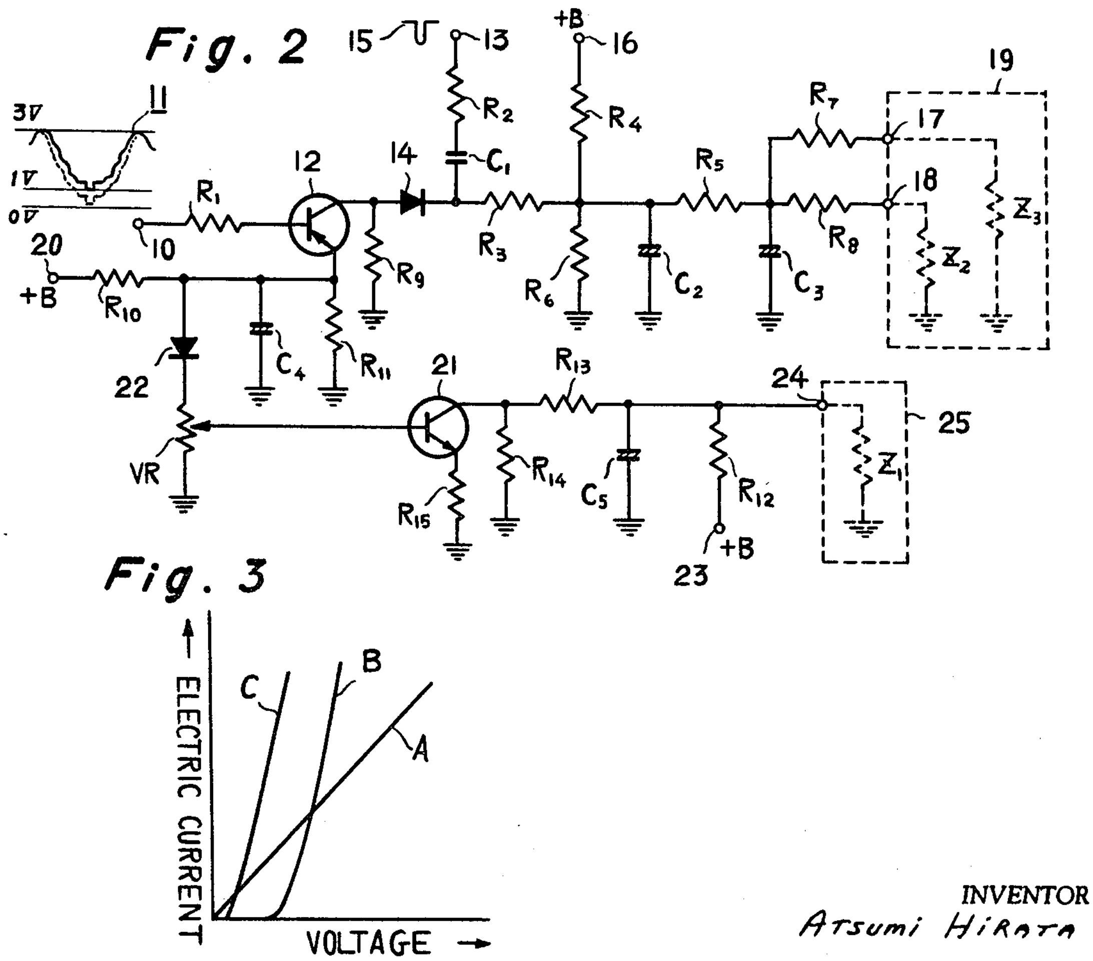
FIG. 2 is a circuit diagram of an embodiment of the present invention.
FIG. 3 is a voltage versus current characteristic curves of individual circuit element.

Next, a practical embodiment of the circuit capable of achieving the above object is explained with FIG. 2. A detected output video signal 11 supplied to a terminal 10 is applied to the base of a transistor 12 through a resistor $R_1$. A waveform of the signal 11 represents a signal with negative going synchronizing signals and, in the present embodiment, at a white peak, a voltage is 3 v. and a synchronizing signal at the maximum value of signal without application of AGC is 1 v. the synchronizing signal approaching 0 v. with the increase of the magnitude of the signal. When the voltage of synchronizing signal portion of the signal 11 applied to the transistor 12 becomes a voltage which is lower than the emitter voltage of the transistor 12 base-emitter voltage Vibe, the transistor 12 comes into a conductive state, namely an ON state. To the collector of the transistor 12 is supplied, from the terminal 13*a*, a horizontal synchronizing pulse 15 of negative polarity through a resistor $R_2$, a capacitor $C_1$, and a diode 14. To terminal 16, a positive voltage +B is applied. As the synchronizing signal voltage of the detected signal approaches 0 v., a value of a direct current voltage drawn out from terminals 17 and 18 through resistors $R_7$ and $R_8$ after being smoothed by a smoothing circuit consisting of a resistor $R_5$, capacitors $C_2$ and $C_3$. This particular direct current voltage drawn out from the terminals 17 and 18 is considered the AGC voltage and is employed for performing the automatic gain controlling function of a intermediate frequency (IF) stage 19.

On the other hand, to the emitter of the transistor 12, the positive voltage +B is applied from a terminal 20 through a resistor $R_{10}$. As the synchronizing signal voltage of the signal 11 approaches 0 v., the emitter voltage of the transistor 12 also changes from the positive voltage values toward 0 v. A base of a transistor 21 is connected to the emitter of the transistor 12 through a variable resistor VR and a diode 22. The adjustable brush of the variable resistor VR is connected to the base of the transistor 21. The transistor 21 is conductive in a saturated state, when the transistor 12 is cut off.

In accompaniment with the change of the emitter voltage of the transistor 12, the voltage between both ends of the variable resistor VR also changes from positive voltage toward 0 v. and accordingly, the base voltage of the transistor 21 takes a change toward 0 v. direction. When the base voltage of the transistor 21 lowers downwardly below such a voltage value which is higher at the base-emitter voltage $V_{be}$ of the transistor 21 than the emitter voltage of said transistor, then the transistor 21 becomes to be in a cutoff and nonconductive (OFF) state. To the collector of the transistor 21, the positive voltage +B is supplied from a terminal 23 through resistors $R_{12}$ and $R_{13}$, and further, a capacitor $C_5$ and a resistor $R_{14}$ are connected as shown in FIG. 2. Accordingly, if the transistor 21 becomes cut off, then the collector voltage of said transistor increases. This collector voltage of the transistor 21 is drawn out of a terminal 24 after smoothing. As the change of the voltage from the terminal 24 is larger than the change of voltages drawn from the terminals 17 and 18, the voltage drawn from the terminal 24 is utilized as the AGC voltage corresponding to a high-frequency stage (tuner) 25. To the emitter of the transistor 21 is connected a resistor 115 as the emitter resistor. Further, $Z_1$ denotes an input impedance of the tuner 25 and $Z_2$ and $Z_3$ input impedance in the IF stage 19 respectively.

As described above, by means of changing the position of the brush of the variable resistor VR, it is possible to vary the base voltage of the transistor 21 and to elect it at any required value. Accordingly, in correspondence to the change of voltage between the both ends of the variable resistor VR showing changes in accordance with the changes of the intensity of the input signal 11, it is possible to change the point where the conductivity of the transistor 21 is started and to select it as desired by adjusting the contact point of the brush of the variable resistor and further, it is possible to change the point S where the AGC voltage corresponding to the input signal intensity begins to be generated and be increased and to select it at any desired point.

In the present embodiment, the resistance value of the individual resistor and the capacitance value of the individual capacitor as shown in the attached drawings runs as follows:

| | | |
|---|---|---|
| Resistor | $R_1$ | 1 KΩ |
| | $R_2$ | 150 Ω |
| | $R_3$ | 2.7 KΩ |
| | $R_4$ | 27 KΩ |
| | $R_5$ | 560 Ω |
| | $R_6$ | 8.2 KΩ |
| | $R_{7,\ 8R}$ | 1 KΩ |
| | $R_9$ | 56 KΩ |
| | $R_{10}$ | 5.6 KΩ |
| | $R_{11}$ | 1.5 KΩ |
| | $R_{12}$ | 4.7 KΩ |
| | $R_{13}$ | 680 Ω |
| | $R_{14}$ | 5.6 KΩ |
| | $R_{15}$ | 15 Ω |
| Capacitor | $C_1$ | 0.047 μf. |
| | $C_2$ | 3.3 μf. |
| | $C_3$ | 5 μf. |
| | $C_4$ | 33 μf. |
| | $C_5$ | 1 μf. |

The voltage-current characteristic of a resistor is shown with a line A as represented in FIG. 3. When the resistor is used in place of the diode 22, as the change of the base voltage of the transistor 21 turns out low in proportion to the change of the emitter voltage, the sensitivity of the AGC diminishes. Further, as a silicon diode is provided with a characteristic B as shown in said figure, it is possible to lower the overall voltage across the variable resistor VR without changing significantly the amplitude of the change of the base voltage of the transistor 21 corresponding to the change, of the emitter voltage of the transistor 12, enabling sufficient improvement of the AGC sensitivity without increasing excessively the emitter resistor $R_{15}$ of the transistor 21.

Further, when a germanium diode which is provided with a characteristic G as shown in said figure is used as the diode 22, the lowered amount of the overall voltage becomes lower than is the case where the silicon diode is employed. Accordingly, it is more desirable to employ the silicon diode as the diode 22. Additionally, in the case when a silicon diode transistor is employed as the transistor 21, because of the higher voltage of the base-emitter voltage of the silicon transistor than the base-emitter voltage of the germanium transistor, it is possible to eliminate the diode 22.

The present invention is not restricted to only the above described embodiment but it may variously be modified within the scope of appended claims without departing from the spirit and scope of the invention.

What is claimed is:

1. An automatic gain control circuit for a television receiver, said circuit comprising a first transistor, means for supplying a detected video signal to the base of said first transistor, means including a resistor connected to the emitter of said first transistor for supplying bias voltage to said emitter, first circuit means connected to the collector of said first transistor for generating a first AGC voltage in response to the amplified detected video signal by said first transistor when the intensity level of said detected video signal surpasses said bias voltage, said first AGC voltage being supplied to intermediate frequency amplifying stages, a second transistor, second circuit means including a series combination of a diode and a variable resistor through which a change of the emitter voltage of said first transistor generated by an emitter current flowing through said resistor in response to the intensity level of said detected video signal is transmitted to the base of said second transistor, third circuit means connected to the collector of said second transistor for generating a second AGC voltage in response to an amplified signal by said second transistor, said second AGC voltage being supplied to a high-frequency amplifying stage, and a means for controlling, by adjustment of said variable resistor, a rising point at which said second AGC voltage begins to be generated proportional to the intensity level of said detected video signal.

2. An automatic gain control circuit as claimed in claim 1, in which a silicon diode is employed as said diode.

3. An automatic gain control circuit as claimed in claim 2, in which a silicon transistor is employed as said second transistor.

4. An automatic gain control circuit as claimed in claim 1, in which a silicon transistor is employed as said second transistor.